(No Model.)

A. BLAUBACH.
LAWN MOWER.

No. 571,550. Patented Nov. 17, 1896.

Witnesses.
A. H. Keeney.
Anna V. Faust.

Inventor.
Albert Blaubach.
By Benedict and Morsell
Attorneys.

UNITED STATES PATENT OFFICE.

ALBERT BLAUBACH, OF MILWAUKEE, WISCONSIN.

LAWN-MOWER.

SPECIFICATION forming part of Letters Patent No. 571,550, dated November 17, 1896.

Application filed December 18, 1895. Serial No. 572,491. (No model.)

*To all whom it may concern:*

Be it known that I, ALBERT BLAUBACH, of Milwaukee, in the county of Milwaukee and State of Wisconsin, have invented a new and useful Improvement in Lawn-Mowers, of which the following is a description, reference being had to the accompanying drawings, which are a part of this specification.

My invention has relation to improvements in lawn-mowers.

Lawn-mowers as now commonly constructed are, owing to the location of the cutting mechanism, incapable of performing efficient work at the edges of the lawn which are bounded by a house, fence, or the like.

It is the object of my invention to provide a lawn-mower comprising an improved construction for efficiently cutting the grass at the extreme edges of the lawn and close up to a house, fence, post, or the like, whereby the necessity of using scissors or similar implements at such places is avoided.

The invention consists of the devices and parts or their equivalents, as hereinafter more fully set forth.

Figure 1:
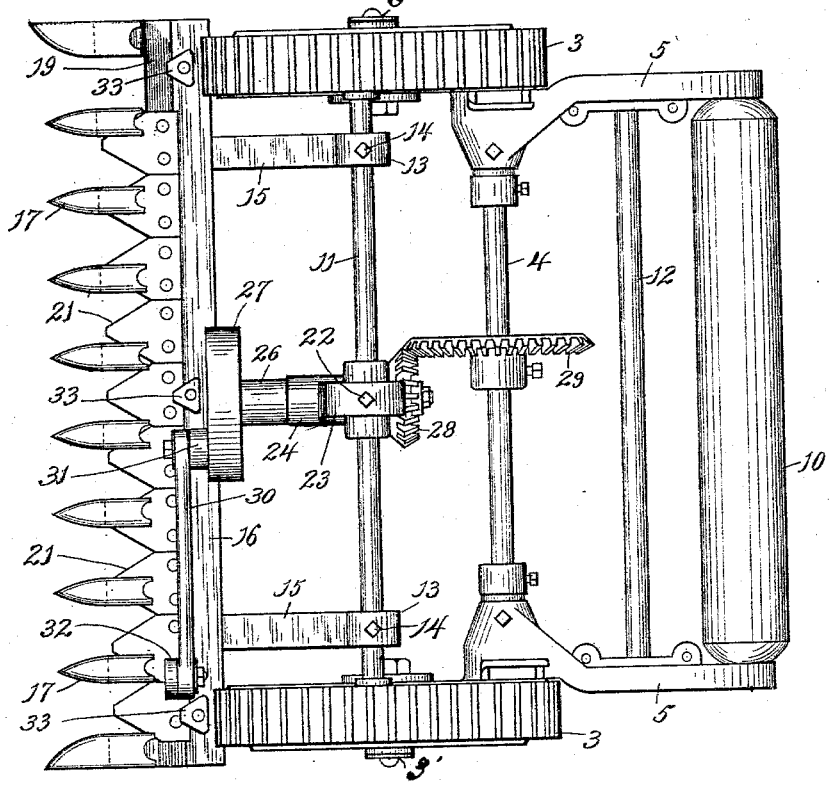
Figure 2:
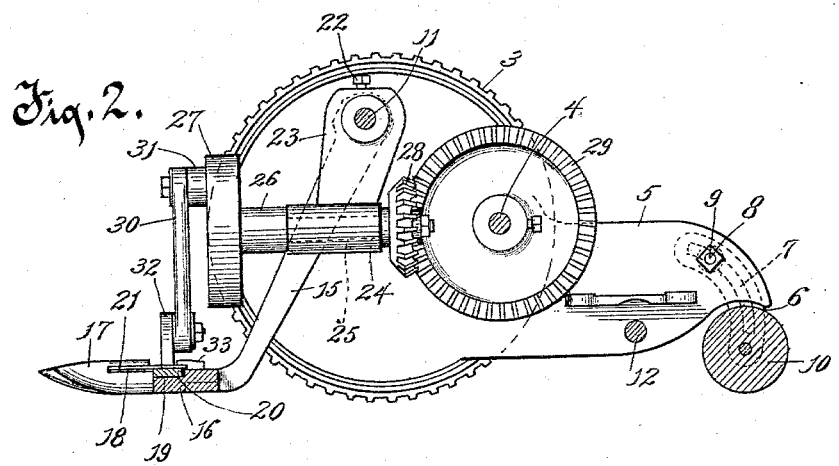

In the accompanying drawings, Figure 1 is a plan view of a lawn-mower embodying my improvements, the handle being omitted; and Fig. 2 is a vertical sectional view of Fig. 1.

Referring to the drawings, the numerals 3 3 indicate the traction-wheels of a lawn-mower, and 4 the driven shaft. These traction-wheels are supported on stub-axles 3' 3', extending from the frame of the mower, and the driven shaft is located in the rear of the frame and geared to the traction-wheels. The usual bracket-arms 5 5 extend rearwardly from this shaft. Curved bearing-arms 6 6 are arranged against the brackets, and these curved bearing-arms are provided with elongated slots similar to 7. Through these slots and through openings in the brackets pass bolts 8, said bolts receiving upon their inner threaded ends nuts 9. The lower ends of the arms 6 form bearings for the journals of the rear roller 10. The machine is provided with the usual transverse forward and rear brace-rods 11 and 12, respectively.

The above-described parts are common to the lawn-mowers now in general use, and hence require no specific description herein.

All the principal parts and elements of the ordinary lawn-mower are employed in my invention with the exception of the cutting mechanism usually used, and in place thereof I substitute my improved cutting apparatus, which will now be specifically described.

Secured on the forward brace-rod 11, near opposite ends thereof, are sleeves 13 13, said sleeves being held securely to place by means of set-screws 14 14. These sleeves are provided with downwardly-extending and forwardly-inclined arms 15 15, and the lower ends of these arms have angular extensions, which connect rigidly with a finger-bar 16, which finger-bar is provided with a series of rigid guard-fingers 17, said fingers provided with transverse slits or bifurcations 18. The finger-bar 16 is provided in its top surface with a recess 19, in which recess is seated a movable cutter-bar 20. This movable cutter-bar has secured thereto and projecting therefrom cutting-blades 21, which fingers are adapted to fit and move transversely in the slits or bifurcations of the blades 17.

Secured about centrally to the brace-rod 11 by means of a set-screw 22 is an arm 23, said arm formed or provided at its lower end with a longitudinal sleeve 24. Passing through this sleeve 24 is a shaft 25, said shaft entering and secured in the hub 26 of a crank-wheel 27. The rear end of the shaft 25 has mounted thereon a beveled pinion 28, which pinion meshes with a beveled gear 29, mounted on the driven shaft 4.

The numeral 30 indicates a pitman, which at its upper end is connected to the wrist or crank 31 of the wheel 27, and at its lower end is pivotally connected to an arm 32, extending upwardly from the movable cutter-bar 20.

The finger-bar 16 has secured thereto a series of plates 33, which plates overlap the movable cutter-bar 20 and serve to hold said cutter-bar in its recess or seat.

In operation, when the lawn-mower is moved forwardly, the driven shaft is rotated, and this rotation, through the intermeshing gears 29 and 28, is imparted to the shaft 25 and crank-wheel 27. As the latter wheel is rotated the movable cutter-bar is longitudinally reciprocated by reason of the pitman connection between said cutter-bar and the crank or wrist of the wheel. It is obvious that, as the cutting mechanism projects forwardly in advance of the driving-wheels, the machine can be run up against a house, fence, or other projection and cut the grass adjacent thereto. This, it is obvious, is impossible in the ordinary form of lawn-mowers. The length of the movable cutter-bar is such that when it reaches the limit of its movement in either direction the ends of the cutter-bar or the end blades 21 of said bar will not project laterally beyond the edges of the end fingers 17. This will adapt the machine to be run up into an angle or corner of a house or fence without danger of injury to the movable bar or the end blades thereon.

The internal gearing of the mower is of course arranged as usual, so that when the machine is pulled rearwardly the driven shaft is not actuated, and consequently no movement is imparted to the cutting mechanism.

The improved cutting mechanism herein shown and described can be readily adjusted so as to be brought closer to or farther from the ground by adjusting the bearing-arms 6 6 of the rear roller. In order to adjust said arms upwardly, all that is necessary to do is to loosen the nuts 9 and when the desired adjustment is obtained again tighten the same. When the arms are thus adjusted upwardly, the cutting mechanism is necessarily brought higher from the ground, and, vice versa, when the bearing-arms are lowered the cutting mechanism is brought closer to the ground.

While I employ the same adjusting mechanism as used in the ordinary lawn-mower, yet it will be observed that it has exactly an opposite effect, for when the bearing-arms in the ordinary form of lawn-mowers are raised the cutting mechanism is lowered, and, vice versa, when the bearing-arms are lowered the cutting mechanism is raised.

What I claim as my invention, and desire to secure by Letters Patent, is—

In a lawn-mower, the combination, of the frame of the mower, stub-axles extending therefrom, traction-wheels supported on said stub-axles, a driven shaft located in the rear of the frame and geared to the traction-wheels, said shaft having a beveled gear mounted thereon, a rigid rod extending transversely from one side of the frame to the other, and at the forward portion of the frame, an arm mounted on the rod, at or near the center thereof, and depending therefrom, said arm formed or provided at its lower end with a sleeve extending at right angles to the rod, a longitudinal shaft journaled in the sleeve, one end of the shaft provided with a beveled gear meshing with the first-mentioned gear, a crank or disk to which the opposite end of said shaft is connected, an arm or arms connected to the transverse rod and extending downwardly therefrom, a transverse finger-bar connected to said arm or arms, a cutter-bar slidingly mounted on the finger-bar, and a pitman connection between the crank or disk and the movable cutter-bar.

In testimony whereof I affix my signature in presence of two witnesses.

ALBERT BLAUBACH.

Witnesses:
 ARTHUR L. MORSELL,
 FRED SCHNEIDER.